(12) United States Patent
Rude (10) Patent No.: US 10,549,719 B2
(45) Date of Patent: Feb. 4, 2020

(54) OBD DEVICE VEHICLE SECURITY ALARM DETECTION

(71) Applicant: Zubie, Inc., Bloomington, MN (US)

(72) Inventor: Michael John Rude, Excelsior, MN (US)

( * ) Notice: Subject to any disclaimer, the term of this patent is extended or adjusted under 35 U.S.C. 154(b) by 53 days.

(21) Appl. No.: 15/902,569

(22) Filed: Feb. 22, 2018

(65) Prior Publication Data

US 2019/0256044 A1     Aug. 22, 2019

(51) Int. Cl.
*B60R 25/102*     (2013.01)
*B60R 25/10*      (2013.01)
*B60R 25/20*      (2013.01)

(52) U.S. Cl.
CPC ........ *B60R 25/102* (2013.01); *B60R 25/1004* (2013.01); *B60R 25/2009* (2013.01); *B60R 2025/1016* (2013.01)

(58) Field of Classification Search
CPC .................................. B60R 1/00; G08G 1/00
See application file for complete search history.

(56) References Cited

U.S. PATENT DOCUMENTS

| | | |
|---|---|---|
| 6,693,563 B2 | 2/2004 | Flick |
| 6,741,187 B2 | 5/2004 | Flick |
| 7,129,833 B2 | 10/2006 | Albert |
| 8,676,151 B2 * | 3/2014 | Mader ............... H04W 4/90 455/404.1 |
| 9,451,028 B2 * | 9/2016 | Rude ................ G07C 5/008 |
| 2010/0142715 A1 | 6/2010 | Goldstein et al. |

FOREIGN PATENT DOCUMENTS

WO        2012097150 A1     7/2012

* cited by examiner

*Primary Examiner* — Shirley Lu
(74) *Attorney, Agent, or Firm* — Carlson, Caspers, Vandenburgh & Lindquist, P.A.

(57) ABSTRACT

Embodiments for an on-board diagnostics (OBD) device are provided herein. The OBD device can monitor a voltage of a battery power contact via a voltage sensor and determine based on changes in the voltage whether a vehicle security alarm of a vehicle has been set-off. If it is determined that the vehicle alarm has been set-off, the OBD device can send an alert to a remote device via a wireless transceiver, wherein the alert indicates that the vehicle security alarm has been set-off.

10 Claims, 4 Drawing Sheets

(54) OBD DEVICE VEHICLE SECURITY ALARM DETECTION

BACKGROUND

Vehicle security systems are common in today's automobiles. When an alarm of the vehicle security system is set-off, the alarm typically sounds the horn or siren on a vehicle and flashes the lights of the vehicle. Often, however, the vehicle owner is not nearby the vehicle and/or the vehicle is parked with a large number of other vehicles (e.g., in a parking lot) so the alarm does not alert the vehicle owner when it is set-off. Some vehicle security systems have the capability to send an alert to a remote device (e.g., a vehicle owner's phone or third-party system) indicating that the alarm has been set-off. Many systems, however, do not have this capability and/or require subscription to a service in order to enable alerts to be sent.

BRIEF DESCRIPTION

Embodiments for an on-board diagnostics (OBD) device are provided. The OBD device includes an OBD connector configured to connect to a corresponding vehicle OBD connector of a vehicle. The OBD connector includes a plurality of contacts for contacting corresponding vehicle contacts of the vehicle OBD connector. The plurality of contacts include at least a ground contact and a battery power contact. The ground and battery power contacts contacting corresponding ground and battery power contacts of the vehicle OBD connector. The OBD device also includes a voltage sensor coupled to the ground and battery power contacts of the OBD connector and a wireless transceiver. The OBD device also includes one or more processing devices coupled to the voltage sensor and the wireless transceiver, and one or more data storage mediums coupled to the one or more processing devices. The one or more data storage mediums include instructions which, when executed by the one or more processing devices, cause the one or more processing devices to monitor a voltage of the battery power contact via the voltage sensor, and determine based on changes in the voltage whether a vehicle security alarm of the vehicle has been set-off. If it is determined that the vehicle alarm has been set-off, the instructions cause the one or more processing devices to send an alert to a remote device via the wireless transceiver, wherein the alert indicates that the vehicle security alarm has been set-off.

Embodiments for a method of detecting a vehicle security alarm with an OBD device are also provided. The method includes monitoring a voltage of a battery power contact of an OBD connector of a vehicle and determining based on changes in the voltage whether a vehicle security alarm of the vehicle has been set-off. If it is determined that the vehicle alarm has been set-off, the method also includes sending an alert to a remote device via the wireless transceiver, wherein the alert indicates that the vehicle security alarm has been set-off.

Embodiments for another on-board diagnostics (OBD) device are also provided. The OBD device includes a physical interface for connecting to an OBD interface of a vehicle. The physical interface includes a first and second power contacts. The first and second power contacts contacting corresponding first and second vehicle contacts of the OBD interface. The first and second vehicle power contacts providing voltage corresponding to the voltage from the battery of the vehicle. The OBD device also includes a microphone and a wireless transceiver. The ODB device also includes a voltage sensor coupled to the first and second power contacts of the physical interface. The OBD device also includes one or more processing devices coupled to the microphone, the voltage sensor, and the wireless transceiver, and one or more data storage mediums coupled to the one or more processing devices. The one or more data storage mediums include instructions which, when executed by the one or more processing devices, cause the one or more processing devices to sample the voltage across the first and second vehicle power contacts and to sample ambient sound proximate the OBD device. The instructions also cause the one or more processing devices to correlate the sampled voltage with the sampled ambient sound, and determine whether a vehicle security alarm of the vehicle has been set-off based on a correlation coefficient output from correlating the sampled voltage with the sampled ambient sound. If it is determined that the vehicle alarm has been set-off, the instructions cause the one or more processing devices to send an alert to a remote device via the wireless transceiver, the alert indicating that the vehicle security alarm has been set-off.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
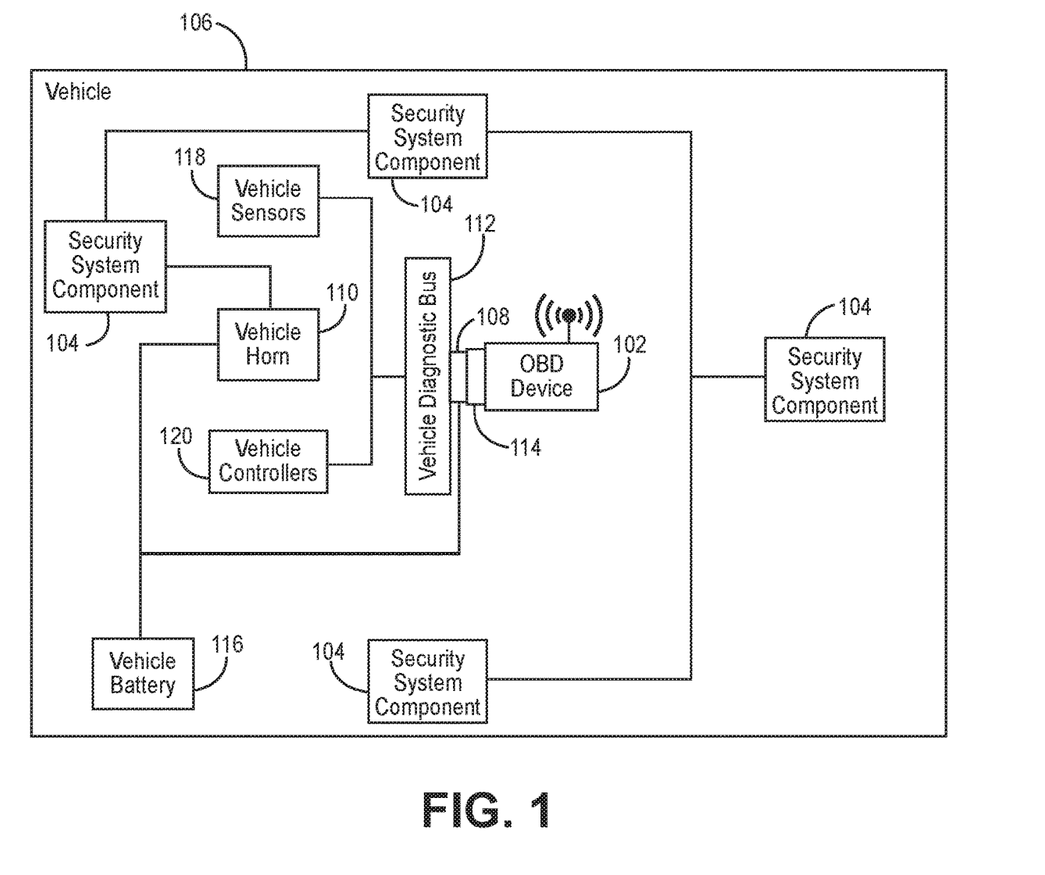
FIG. 1 is a block diagram of an example vehicle including an installed vehicle security system and an on-board diagnostics (OBD) device for detecting an alarm of the vehicle security system.

FIG. 1 is a block diagram of an example vehicle 106 including a vehicle security system 104 and an on-board diagnostics (OBD) device 102 that can determine that an alarm of the vehicle security system 104 has been set-off. The OBD device 102 is a device that can be communicatively coupled to a diagnostics bus 112 of the vehicle 106 via connection to an OBD connector 108 of the vehicle 106. The OBD connector 108 of the vehicle 106 is a physical connector 108 that is coupled to the vehicle's diagnostics bus 112, over which the vehicle sensors 118, vehicle control electronics 120, and other electronics in the vehicle 106 communicate. The OBD connector 108 is intended to be accessed without having to remove any major panels or otherwise disassemble major components of the vehicle 106. As such, the OBD connector 108 is exposed in the interior of the vehicle 106 or is otherwise easily accessible to an individual proximate the vehicle 106. Typically, the OBD connector 108 is located under the dash.

A vehicle security system 104 includes a plurality of components, such as controllers and sensors, that detect unauthorized events associated with a vehicle security threat and set-off an alarm based thereon. The security system components 104 communicate with each other over a dedicated network that is distinct from the diagnostics bus 112 of the vehicle 106. That is, a typical vehicle security system 104 is not connected or otherwise coupled to the OBD connector 108 or the diagnostics bus 112 of the vehicle 106. In rare situations, security system components 104 are communicatively coupled to the vehicle's diagnostics bus 112. In these rare situations, the security system components 104 can communicate over the diagnostic bus 112, but the security system components use a proprietary (non-public) protocol to communicate, so third-party devices (e.g., a third-party device connected to the OBD connector 108) are not able to communicate with the security system components 104.

Vehicle security systems components 104 are installed in disparate locations throughout the vehicle 106. The security system components 104 and their associated wiring are installed out-of-sight, behind the major dash, door, and other panels in the vehicle 106. As such, aftermarket installation requires removing of major panels in the vehicle 106 and/or lifting of the vehicle's hood to access the areas in the vehicle 106 in which the vehicle security system 104 is installed. Removal of the vehicle security system 104 is equally as complicated, and is often never done.

The OBD device 102 is a single device and does not require complicated installation in the vehicle 106. The OBD device 102 is used by connecting it to the exposed OBD connector 108 of the vehicle 106. Accordingly, the OBD device 102 can be easily connected and disconnected from the vehicle 106 by use of the OBD connector 108 on the vehicle 106.

It may be desirable for an entity (e.g., vehicle owner, third-party) to receive an alert that the vehicle security alarm in their vehicle 106 has been set-off. Many vehicle security systems, however, do not provide such a capability. In other instances, the security system provides the capability, but the security system's company may charge for the service.

The OBD device 102 provides an entity with another option for receiving an alert when a vehicle security system 104 is set-off. The OBD device 102 piggy-backs off of an already installed vehicle security system 104, and sends an alert in response to determining that the already installed vehicle security system 104 has been set-off. The OBD device 102 need not, itself, include any sensors or controllers for directly detecting an unauthorized event (e.g., a window breaking, forced unlock, etc.) on the vehicle 106. Instead, the OBD device 102 relies on the unauthorized event detection of the already installed vehicle security system 104. If the installed vehicle security system 104 determines that unauthorized activity has occurred, the vehicle security system 104 can sound its alarm in the normal manner as it is programmed to.

The OBD device 102, instead of directly detecting the unauthorized activity, detects sounding of the alarm of the vehicle security system 104. In response to detecting sounding of the alarm, the OBD device 102 can send an alert to a remote device indicating that the vehicle security alarm has been set-off. The OBD device 102, therefore, can enable an alert to be provided to a remote device based on a security system 104 that does not include the capability to send alerts. Alternatively, the OBD device 102 provides another option for an alert, if the installed security systems 104 is capable of sending alerts. If the installed security system 104 is capable of sending alerts, the OBD device 102 may be a cheaper option, or may provide enhanced capabilities (e.g., more control over alerts, integration with other vehicle telematics interface, etc.) over the alerts of the installed security system 104. Notably, the OBD device 102 provides such capabilities without requiring a complex and costly install of a different security system 104.

Since the OBD device 102 is distinct from the security system 104, a single OBD device 102 can be configured to detect multiple different security systems. This can make is easier for a consumer to purchase the OBD device 102, as a single model of OBD device 102 can detect many different (e.g., all) security systems. In such a situation, a consumer need not know the exact type of security system 104 that is already installed in their vehicle 106 upon purchase of the OBD device 102. Instead, the consumer can simply purchase the OBD device 102 and be confident that it will detect whatever security system is installed in their vehicle 106. In some examples, multiple different models of OBD device 102 can be offered to the consumer, where each model covers a set of security systems or vehicle makes and models.

The trade-off of the OBD device 102 being distinct from the security system 104, is that the OBD device 102 may not have access to the components and communications of the security system 104. Thus, the OBD device 102 may not be able to detect messages from the vehicle security system 104, or between components 104 thereof, indicating that an unauthorized activity has occurred or that the alarm has been set-off. Even though the OBD device 102 will have access to the vehicle's diagnostics bus 112 (e.g., controller area network (CAN) bus) via the OBD connector 108 of the vehicle 106, most security systems are not coupled to the diagnostics bus 112. Thus, communications of the security system 104 are not accessible via the diagnostics bus 112. For security systems 104 that are coupled to the diagnostics bus 112, the communications of the security system 104 are likely still not accessible to the OBD device 102, as the security system 104 likely uses proprietary messages on the bus 112. Thus, it may be difficult or impossible for the OBD device 102 to detect a security system 104 being set-off based on signals or messages sent by the security system 104 or components thereof. This is true even of indirect messages sent on the diagnostics bus 112, such as a message sent to activate the horn 110 or siren on a vehicle 106. Since different makes and models of vehicles 104 use different messages on the diagnostics bus 112, it would require significant design effort and knowledge of proprietary messages from manufactures to ensure the OBD device 102 can recognize such messages from a wide range of vehicles.

Figure 2:
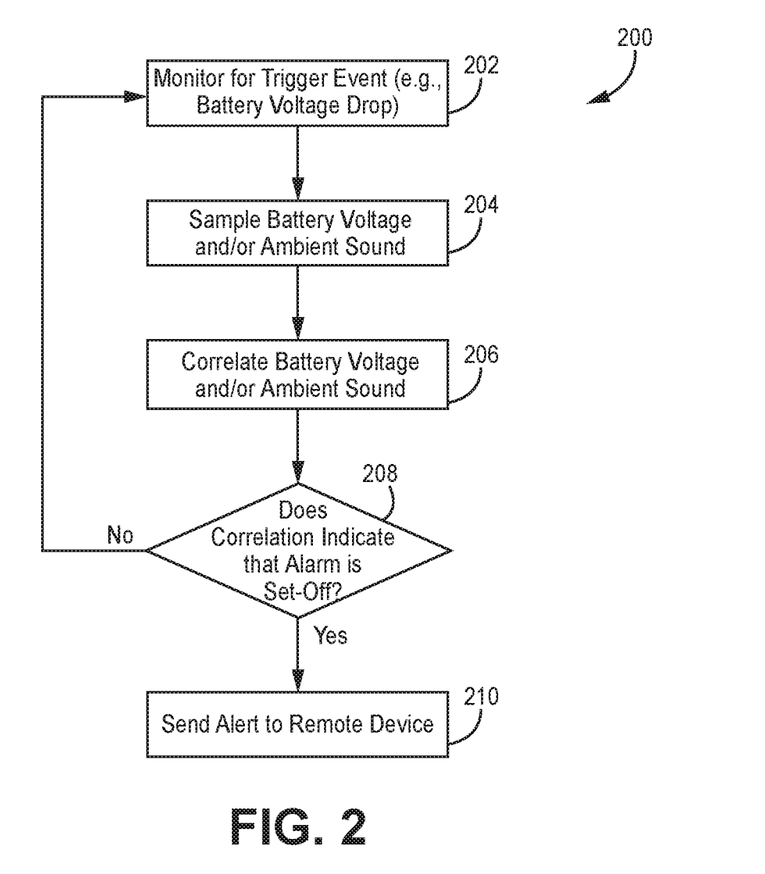
FIG. 2 is a flow diagram of an example method of detecting a vehicle security alarm with the OBD device of FIG. 1.

FIG. 2 is a flow diagram of an example method 200 of detecting a vehicle security alarm with an OBD device 102. The OBD device 102 detects a vehicle security alarm being set-off based on activation of the horn 110 or siren of the vehicle 106, which usually occurs as part of the vehicle security alarm being set-off. The OBD device 102 detects activation of the horn 110 or siren of the vehicle 106 by identifying changes in the battery voltage and/or sound that correspond to a vehicle security alarm being set-off.

The method 200 can include the OBD device 200 monitoring for a trigger event (block 202). A trigger event is an event that occurs when a vehicle security alarm is set-off. The ODB device 200 monitors for a trigger event and proceeds further in the method 200 in response to detecting a trigger event. Ideally, a trigger event is an event that can be monitored by the OBD device 200 while the OBD device 200 is drawing low power.

To monitor for a trigger event, the OBD device 102 can continually (e.g., periodically) sense the batter voltage and/or sound for the trigger events. In an example, monitoring includes monitoring for a temporary change in the voltage of the battery 116 of the vehicle 106. The voltage of the battery 116 (also referred to herein as simply the "battery voltage") is the voltage supplied by the battery 116 of the vehicle 106. The battery 116 of the vehicle 106 can provide power to the starter of the vehicle 106, the horn 110, and other electronic components (e.g., security system 104, sensors 118, controllers 120) of the vehicle 106. If the vehicle has an electric motor for providing motive power (e.g., a hybrid or plug-in electric vehicle), the voltage that provides power to the horn 110, security system 104, sensors 118, and controllers 120 is typically on a separate circuit or is a distinct voltage rail, from the batteries or voltage that provides power to the electric motors providing motive power to the vehicle 106. As used herein the term "battery voltage" refers to the voltage or voltage rail the provides power to the horn 110, security system 104, sensors 118, and controllers 120, and not to the voltage or voltage rail that provides power to electric motors of the vehicle 106, if such voltage rails are distinct. The battery voltage is also coupled to contacts on the OBD connector 108, such that devices that connect to the OBD connector 108 can obtain operating power from the battery voltage.

When a security system 104 is set-off, it typically activates the horn 110 or a siren on the vehicle 106. When the horn 110 or siren of a vehicle 106 is activated, the power draw of the horn 110 or siren causes a slight, temporary change in the battery voltage. The change in battery voltage is temporary, because the horn 110 or siren is on for a length of time and then off again. The battery voltage will change during the time period in which the horn 110 or siren is activated, and then will return back to the steady-state voltage (ignoring other draws on the battery voltage). The temporary change can be a decrease in battery voltage due to the draw of the horn 110 or siren, an increase in battery voltage due to inductive loads on the battery, or both increase(s) and a decrease(s) over a period of time.

The temporary change in battery voltage can be a trigger event that is detected by the OBD device 102. The normal battery voltage of a fully charged battery is around 12 or 24 volts depending on the vehicle. To detect the temporary change in battery voltage, the OBD device 102 can monitor the battery voltage to detect the temporary change from the normal battery voltage caused by the power draw of the horn 110 or siren. In an example, a temporary change is identified as a change in voltage above and/or below a threshold voltage, wherein the change occurs for a length of time that is within a window of time. The threshold voltage can be set based on the amount of voltage change that horn activation typically incurs. In an example, a steady-state voltage of the battery 116 is determined, and the threshold voltage is dynamically set at a desired voltage below the steady-state voltage. In an implementation of this example, the threshold can be 0.5 volts below the steady-state voltage, such that a steady-state voltage of 12.3 volts would result in a temporary change meeting the threshold if the voltage dropped below 11.8 volts. By using a threshold that is based on the steady-state voltage of the battery 116, the voltage level at which a temporary change meets the threshold would track the stead-state voltage. Thus, if the steady-state voltage changes over time, (e.g., due to charging or discharging of the battery 116), the voltage level at which a temporary change would meet the threshold changes correspondingly. In an example, the threshold is in the range of 0.1 to 0.5 volts from the steady-state voltage level. In a more specific example, the threshold is in the range of 0.2 to 0.3 volts from the steady-state voltage level. Once the voltage raises above or drops below the threshold, the OBD device 102 can measure the length of time the voltage stays above/below the threshold. Based on how long the OBD device 102 stays above/below the threshold, the OBD device 102 can distinguish temporary changes caused by activation of the horn 110 or siren, from other types of temporary changes caused by other activities.

If the voltage raises/drops and stays above/below the threshold for a length of time that falls within a window of time, the OBD device 102 determines that the temporary change is caused by activation of the horn 110 or siren. If the voltage raises/drops above/below the threshold but does not stay above/below the threshold for at least a minimum time period or drops or stays below the threshold for longer than a maximum time period (i.e., the length of time does not fall within the window of time), the OBD device 102 determines that the temporary change is caused by another activity. The window of time includes time periods between from a minimum time period to a maximum time period. The minimum time period is used to exclude voltage changes that are shorter than that caused by the horn/siren 110, such as a quick temporary change caused by something other than the horn/siren 110, and the maximum time period is used to exclude longer term voltage changes such as a slow change in voltage as the battery 116 charges or discharges. The window of time is set to capture the likely length of time of the temporary voltage change caused by the horn 110 or siren. In an example, the minimum time period is about 0.1 seconds and the maximum time period is 0.5 seconds. Other windows of time can also be used.

Instead of, or in addition to, monitoring the battery voltage, monitoring can include monitoring for the sound of the horn 110 or siren. That is, the sound produced by the horn 110 or siren can be a trigger event. The OBD device 102 can include a sound sensor (e.g., microphone) to monitor for the sound produced by the horn 110 or siren. Using the sound sensor, the OBD device 102 can detect the sound produced by the horn 110 or siren by distinguishing the sound produced by the horn 110 or siren from background noise. The horn/siren sound can be distinguished from background noise in any suitable manner. In an example, the OBD device 102 distinguishes the horn/siren sound by detecting when the intensity of the sound (e.g., the sound power level) increases a threshold amount. In an implementation of this example, the threshold is a certain decibel level above the background noise (e.g., 30 decibels above the noise). In an alternative implementation of this example, the threshold is a set level, such as 100 decibels. Instead of, or in addition to, distinguishing the horn/siren sound by intensity, the OBD device 102 can distinguish the horn/siren sound by its frequency (e.g., frequency signature). That is, the OBD device 102 can be configured to distinguish the frequency of the horn/siren 110 of the make and model of the vehicle 106 that the OBD device 110 is being connected to from non-horn/siren sounds. In an implementation of this example, the frequency signature can be specific enough to distinguish the frequency signature of a specific make and/or model of vehicle. In another implementation, in addition to, or instead of, distinguishing different vehicles from one another, the OBD device 102 can distinguish between different brand/types of security alarms, since different alarms may produce different lengths of sounds even if installed on a common make and model of vehicle.

In an example, in response to detecting a trigger event, the OBD device 102 can begin sampling the battery voltage and/or sampling the ambient sound around the OBD device 102 (block 204). In some examples, monitoring for a trigger event (block 202) does not occur in method 200, instead, the OBD device 102 monitors the battery voltage and/or the ambient sound continuously during method 200. In any case, the OBD device 102 can sample the battery voltage and/or the ambient sound and perform a correlation to determine whether the vehicle security alarm has been set-off.

As discussed above, both the battery voltage and the sound proximate the vehicle 102 will change in a predictable manner due to a vehicle alarm being set-off. Thus, the OBD device 102 can correlate the battery voltage and/or sound with other information (block 206), to enable the OBD device 102 to independently determine whether the vehicle security alarm has been set-off. The OBD device 102 can correlate the sampled battery voltage with either or both of the sampled sound proximate the vehicle or a stored battery voltage profile corresponding to a vehicle security alarm sounding. Instead of, or in addition to, using the battery voltage, the OBD device 102 can correlate the sampled sound proximate the vehicle with a sound profile corresponding to a vehicle security alarm sounding. In any case, suitable sampling rates and schemes are known to those skilled in the art, and any suitable sampling can be used. In examples where both the battery voltage and the ambient sound are sampled, the voltage and sound can be sampled contemporaneously, so that an activation of the horn/siren can be captured by both the sound sampling and the battery voltage sampling. In an example, the sampling of the battery voltage is done at a common time base/rate as the sampling of the ambient sound (e.g., 500 Hz or 1000 Hz).

A vehicle alarm sounding can be detected by correlating the sampled battery voltage and the sampled sound, because during sounding of the vehicle alarm, changes in battery voltage being captured in the samples are at least partially caused by activation of the horn 110 or siren. The ODB device 102 can, therefore, determine that the security alarm has been set-off by identifying a correlation between the changes in the battery voltage and samples of horn 110 or siren sound by the sound sensor. Correlating the sampled battery voltage and the sampled sound allows the ODB device 102 to distinguish between the horn 110 or siren of the vehicle 106 to which the OBD device 102 is connected, and a horn or siren of a nearby vehicle, because a horn or siren of the nearby vehicle will not generate a change in the battery voltage.

As mentioned above, in some examples the OBD device 102 can include stored voltage and/or sound profiles and correlate the sampled battery voltage and/or sound with the corresponding stored profile. Such a stored profile can be a stored indication of the changes to the battery voltage/ ambient sound that occur while the vehicle alarm is set-off. Such a stored profile can be generic, in that the profile covers a wide variety of vehicles and vehicle security alarms, or can be more specific, directed to a specific make and model of vehicle or security alarm or set of vehicles or security alarms. In an example, the OBD device 102 can correlate the sampled battery voltage and/or sampled sound with multiple different voltage/sound profiles, each voltage/sound profile corresponding to a different make and model of vehicle or security alarm or set of vehicles or security alarms.

The output of a correlation is a correlation coefficient. Based on the correlation coefficient(s), the OBD device 102 can determine whether the vehicle alarm has been set-off (block 208). For example, if a single correlation is performed, and the correlation coefficient is above a threshold, the ODB device 102 can conclude that the vehicle alarm has been set-off. If a single correlation is performed, and the correlation coefficient is below the threshold, the OBD device 102 can conclude that the vehicle alarm has not been set-off.

In examples where multiple correlations are performed, the OBD device 102 can look at the correlation coefficients from the multiple correlations and make a decision as to whether the vehicle security alarm has been set-off. In examples where two or more of the following correlations are performed: the sampled battery voltage is correlated with the sampled sound, the sampled battery voltage is correlated with one or more voltage profiles, and the sampled sound is correlated with one or more sound profiles, the correlation coefficients from each of the correlations can be combined (e.g., by averaging) to obtain a composite correlation coefficient. The OBD device 102 can then determine whether the vehicle security alarm has been set-off based on the composite correlation coefficient. In examples where the sampled battery voltage and/or sampled sound is correlated with multiple different voltage/sound profiles, the correlation coefficient indicating the closest correlation can be used to make the decision as to whether the alarm has been set-off. For example, if the sampled battery voltage is correlated with multiple different voltage profiles, and the sampled sound is correlated with multiple different sound profiles, the correlation coefficient indicating the closest correlation of the multiple voltage profile correlations and the correlation coefficient indicating the closest correlation of the multiple sound profile correlations, can be combined to form a composite correlation coefficient to be used for the alarm decision.

Suitable correlation techniques are known to those skilled in the art. In an example, the battery voltage samples and the battery voltage profile(s) capture the voltage level of the battery voltage. In an example, the sound samples and the sound profile(s) capture the intensity (e.g., sound power level) of the sound. The correlation can be configured to detect similarities in changes of the battery voltage and/or changes in the sound intensity, as activation of the horn 110 or siren will cause both to occur. In an implementation, the correlation can be configured to detect similarities in time and amplitude change of the battery voltage and/or changes in intensity of ambient sound around the OBD device 102. The battery voltage samples and/or ambient sound samples can be filtered prior to being correlated to remove the DC level and background noise as well as other aspects if desired. Advantageously, by correlating the battery voltage and/or the ambient sound, the OBD device 102 can identify horn/siren activation, and correspondingly, the vehicle alarm being set-off without having knowledge of the specific characteristics of the alarm sounding. For example, regardless of what the frequency of the horn 110 is, the rate or pattern of repetition of the horn 110, or the number of repetitions of the horn 110, the changes in battery voltage and the changes in ambient sound power level will correlate when the horn 110 is activated by the vehicle alarm being set-off. Thus, these horn activations can be identified via correlation without knowledge of the specific characteristics of the alarm sounding.

To exclude a horn 110 or siren activation that is not initiated as a result of the vehicle security system being set-off, the ODB device 102 can be configured to identify multiple horn activations (synchronous horn sounding and battery voltage change) within a certain period of time, in order to determine that the vehicle security system has been set-off. For example, two or fewer horn activations within a defined period of time can be ignored as such horn activations could be caused by other activities, such as horn activation indicating locking of the door or activation of the remote start system. The OBD device 102 can determine that three or more horn activations within a defined period of time, however, correspond to setting-off of the vehicle security alarm. Example defined periods of time include 5 seconds and 10 seconds, although other periods of time can also be used. In an example, the number of horn activations and/or period of time can be built into the correlation itself (e.g., the correlation algorithm can output a higher coefficient for multiple temporary voltage changes/sound power peaks in sync, or for longer periods of correlation). In another example, the number of horn activations and/or period of time can be taken into account after correlation. For example, if multiple shorter periods each having a coefficient above the threshold are detected within a longer period of time, the OBD device 102 can conclude that the vehicle alarm has been set-off. If, however, only a single coefficient for a short period of time is detected, the OBD device 102 can determine that the alarm has not been set-off.

Correlating can also include identifying a common pattern of the occurrence of the horn activations. Often, a vehicle alarm sounds the horn in a periodic manner—repeating the steps of turning the horn/siren ON for a first length of time and then OFF for a second length of time. This ON-and-OFF pattern causes a corresponding pattern of temporary changes in the battery voltage. The OBD device 102 can be configured to identify that the vehicle security alarm has been set-off if the ON-and-OFF pattern of horn/siren sounding and commonly timed temporary changes in the battery voltage matches this expected pattern (e.g., the timing of ON and the timing of OFF) of horn activation. If the ON and OFF of the horn 110 does not match the expected pattern, the OBD device 102 can ignore the horn activation as caused by something other than the vehicle security system alarm.

In some examples, other actions may also be occurring in response to setting-off of the security alarm (e.g., flashing of the headlights). These other actions may also cause temporary changes in the battery voltage. The OBD device 102 can include instructions that can identify a pattern in common between the temporary voltage changes and the horn sound detection even in the presence of other actions causing additional temporary changes to the battery voltage. For example, as long as there is a temporary change that occurs at the same time as detection of each horn sound, the OBD device 102 can determine that the vehicle alarm has been set-off. In some examples, the sound profile for the vehicle can be referenced to aid in identifying the pattern (e.g., length of time of and between the horn soundings). For example, if a horn sound and a temporary battery voltage change both occur at each of the expected times in accordance with the sound profile, the OBD device 102 can determine that the vehicle alarm has been set-off. Other methods of identifying a correlation between the temporary voltage change and the horn sound detection can also be used.

The above described voltage thresholds, windows of time, and/or sound signature (e.g., frequency(ies), frequency signature) for detecting a trigger event, as well as the pattern or patterns that the OBD device 102 compares to ON and OFF timing of the horn/siren activation and/or correlation technique can be stored in an alarm profile on the OBD device 102. The alarm profile can be fixed (i.e., set by the manufacturer) and/or field-configurable (e.g., settable by a user after purchase or at the time of connection to a vehicle 106). A fixed alarm profile means that the OBD device 102 is set at the factory to include one or more sound profiles that enable the OBD device 102 to detect an alarm for a desired set of vehicles (e.g., a subset of vehicles or all vehicles) and/or security system 104 to which the OBD device 110 is likely to be installed.

Field-configurable means that the OBD device 102 can be set outside of the factory, after sale of the OBD device 102, with one or more alarm profiles to detect an alarm of a particular set or individual make and model of vehicle and/or security system 104. In an example, the field-configuration can be manual. That is, an individual can manually select the make and model of vehicle 106 and/or security system 104 in the vehicle 104 to which the OBD device 110 is being connected. The OBD device 110 can then load the alarm profile for that vehicle 106 and/or security system 104 to use in detecting the alarm of that make and model of vehicle 106 and/or security system 104.

In another example, the field-configuration can be automatic. That is, the OBD device 102 can automatically determine a make and model and/or security system 104 of the vehicle 106 to which the OBD device 102 is connected and load the corresponding alarm profile for use in detecting the alarm of that make and model of vehicle 106 and/or security system 104. The OBD device 102 can automatically determine the make and model of the vehicle 106 and/or security system 104 and load the corresponding alarm profile via communication with vehicle components or security system components in the same manner as the communication profile is selected and loaded in U.S. Pat. No. 9,451,028, which is hereby incorporated herein by reference.

In yet another example, the field-configuration can be a calibration process performed by the OBD device 102. The calibration process can be a process where the OBD device 102 is connected to the OBD connector 108 of the vehicle 106, a vehicle alarm is intentionally triggered, and the OBD device 102 senses the changes in battery voltage and sound that occur. Based on the sensed changes, the OBD device 102 can create an alarm profile for the vehicle 102. The calibration process can include intentionally triggering the vehicle alarm one or multiple times. The vehicle alarm can be intentionally triggered by a user pressing the panic button on a wireless unlocking device.

To perform the calibration process, the calibration can first be initiated to arm the OBD device 102. In an example, the calibration process can be initiated manually, i.e., by a user setting-up the OBD device 102. Manual initiation can include sending a message from a mobile device (e.g., phone) to the OBD device 102, requesting that the OBD device 102 initiate the car alarm calibration process. In an example, the message from the phone can be sent from an OBD device app on the phone, wherein the ODB device app is part of a system including the OBD device app, the OBD device 102, and one or more servers that are communicatively coupled to the OBD device and the OBD device 102. Manual initiation can also include pressing a button on the OBD device 102. As an alternative to manual initiation, the calibration process can be initiated automatically. The calibration process can be initiated automatically by the OBD device 102 detecting connection to an OBD connector 108 of a vehicle 106 to which the OBD device 102 has not previously been calibrated.

The OBD device 102 can provide an indication to a user that the OBD device 102 is ready to capture characteristics of the vehicle alarm. The indication can be in any suitable form including a message sent from the OBD device 102 to the OBD device app on the mobile device, or a light or sound indication from the OBD device 102. In response to receiving the indication that the OBD device 102 is ready to capture characteristics of the vehicle alarm, the user can trigger the vehicle alarm.

The OBD device 102 can capture characteristic of the vehicle alarm and to create a vehicle profile. The characteristics captured can include the battery voltage and/or the ambient sound proximate the vehicle 106. In an example, the OBD device 102 can begin capturing characteristics contemporaneously with providing the indication to the user, such that when the user subsequently triggers the vehicle alarm, the OBD device 102 captures the voltage and/or sound changes caused by the vehicle alarm. In an example, the OBD device 102 can capture characteristics for a predefined period of time (e.g., 30 seconds).

The OBD device 102 can also provide an indication that capturing of characteristics of the vehicle alarm is complete. This indication can also be in any suitable form including a message sent from the OBD device 102 to the OBD device app on the mobile device, or a light or sound indication from the OBD device 102. In response to receiving the indication that the OBD device 102 has completed capturing characteristics of the vehicle alarm, the user can end sounding of the vehicle alarm. The OBD device 102 can also stop capturing the characteristics of the vehicle alarm contemporaneously with providing the indication that capturing is complete.

The OBD device 102 can store the captured characteristics as an alarm profile. The alarm profile can include a voltage profile, which includes the voltage changes that occur during sounding of a vehicle alarm. The alarm profile can also include a sound profile, which includes the sound changes that occur during sounding of a vehicle alarm.

Figure 3:
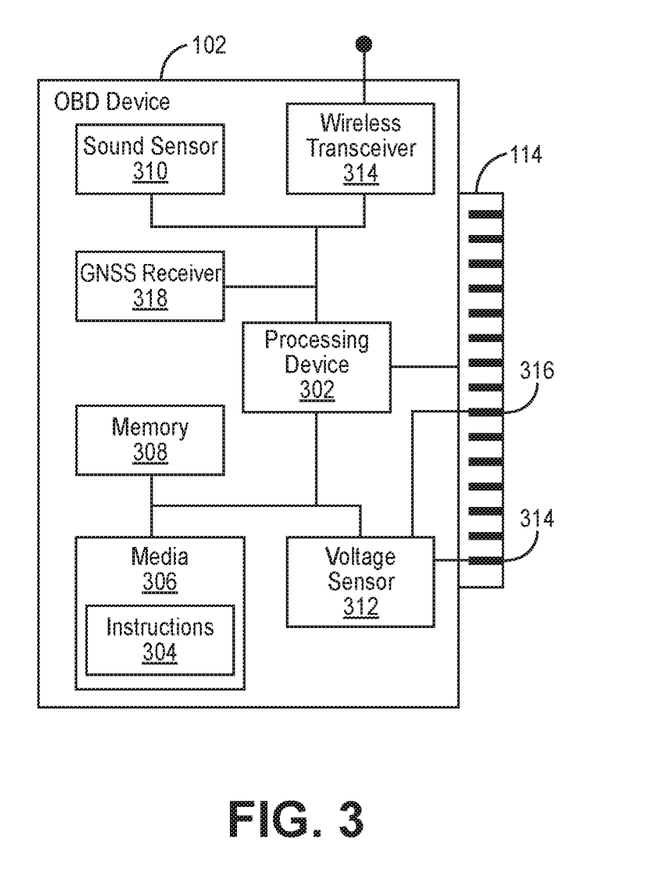
FIG. 3 is a block diagram of an example OBD device of FIG. 1.

If it is determined based on the correlation coefficient that the vehicle alarm has been set-off, the ODB device 102 can send an alert to the remote device indicating the security alarm of the vehicle 106 has been set-off (block 210). The alert is sent by the wireless transceiver 314 and can have any suitable form (e.g., a message) and be sent to any desired remote device. In an example, the remote device is a mobile phone of a user associated with the vehicle 106 and/or the OBD device 102. In such an example, the alert can be a text message or a message sent over the Internet to an app associated with the OBD device 102. In some examples, the alert from the OBD device 102 can be sent to a server, which can manage sending further alerts to other remote devices, such as the mobile phone and/or a third-party. Third-parties can include the police, a security company, or other entity. In an example, the alert can include a location (e.g., GPS coordinates) of the vehicle 106. The vehicle's location can be provided to the user and/or to the server. In an example, the server can use the location to determine which third party to send an alert to, such as which police department to send the alert to. In an example, the OBD device 102 and/or server can send multiple alerts for a single vehicle alarm sounding determination, such as alerts to multiple different mobile phones.

If it is determined that the vehicle alarm has not been set-off based on the correlation coefficient, the method 200 can proceed back to monitoring for another trigger event (block 202). In an alternative example, if it is determined that the vehicle alarm has not been set-off based on the correlation coefficient, the method 200 can proceed back to sampling more battery voltage and ambient sound, if a longer sampling period is desired. In such an alternative example, after a desired number (e.g., 1, 2, 3) loops through the method 200, further sampling the battery voltage and ambient sound, if it has not been determined that the vehicle alarm has been set-off, the method 200 proceeds back to monitor for another trigger event (block 202). Accordingly, the method 200 can continually be monitoring for a trigger event (block 202) or sampling and processing the battery voltage and ambient sound to determine whether an alert has been sent (blocks 204-208) until it is determined that a vehicle security alarm has been set-off.

The method 200 of detecting of vehicle security alarms can be disabled at times to protect against false alarms. For example, the OBD device 102 can detect whether the vehicle ON and disable the detecting of vehicle security alarms while the vehicle 106 is ON. A vehicle 106 is ON when the vehicle is running or is otherwise in a drivable state (e.g., for an electric or hybrid electric vehicle). Typically, the vehicle alarm cannot be triggered while the vehicle 106 is ON, thus, any horn activation that occurs during this time would not be the vehicle alarm. The OBD device 102 can detect whether the vehicle 106 is ON by one or more of detecting whether the vehicle is moving, identifying readings from vehicle sensors corresponding to a running vehicle, querying a vehicle computer to ask if the vehicle is ON, detecting a change level applied to a battery by an alternator, and other means. The OBD device 102 can likewise detect when the vehicle 106 is OFF using similar means and perform method 200 for detecting of vehicle security alarms while the vehicle 106 is OFF.

FIG. 3 is a block diagram of an example OBD device 102. The OBD device 102 includes one or more processing devices 302 for executing instructions 304. The one or more processing devices 304 can include a general-purpose processor (e.g., a central processing unit (CPU)) or a special purpose processor (e.g., a digital signal processor (DSP)). The instructions 304 are stored (or otherwise embodied) on or in an appropriate storage medium or media 306 (such as flash, EEPROM, or other non-volatile memory), which is coupled to the one or more processing devices 302. The instructions 304 are readable from the storage media 306 by the processing device(s) 302 for execution thereby. The OBD device 102 also includes a memory 308 that is coupled to the processing devices 302 for storing instructions (and related data) during execution by the processing device(s) 302. Memory 308 comprises, in one implementation, any suitable form of random access memory (RAM) now known or later developed, such as dynamic random-access memory (DRAM). In other implementations, other types of memory are used.

The ODB device 102 also includes a sound sensor (e.g., microphone) 310 coupled to the processing device(s) 302 and configured to sense sound in the environment around the ODB device 102. The OBD device 102 also includes a voltage sensor 312 that is configured to sense the battery voltage of a vehicle 106 to which the OBD device 102 is connected. The OBD device 102 also includes a wireless transceiver 314 coupled to the processing device(s) 302 for sending and receiving wireless communications. The wireless transceiver 314 can be configured to communicate with a cellular tower 106 using any appropriate protocol. Example wireless communication protocols used by the wireless transceiver 314 include 2G (e.g., GPRS), 2.5G, 3G, or 4G (e.g., WiMax, LTE) protocol, or any future protocol.

The instructions 304, when executed by the processing device(s) 302, can cause the processing device(s) 302 to implement the functions of the OBD device 302 described herein. For example, the instructions 304 can cause the processing device(s) 302 to implement the method 200 described herein.

The OBD device 102 also includes an OBD connector 114. The OBD connector 114 is a physical interface that can mate with an OBD connector 108 of a vehicle 106. The OBD connector 114 includes a plurality of contacts that contact corresponding contacts on the vehicle's OBD connector 108. The OBD connector 114 can be any suitable connector that can connect to the desired on-board diagnostics connector of the desired vehicle. In an example, the OBD connector 114 conforms to the OBD-II standard defined in the society of automotive engineers (SAE) J 1962 standard document.

Figure 4:
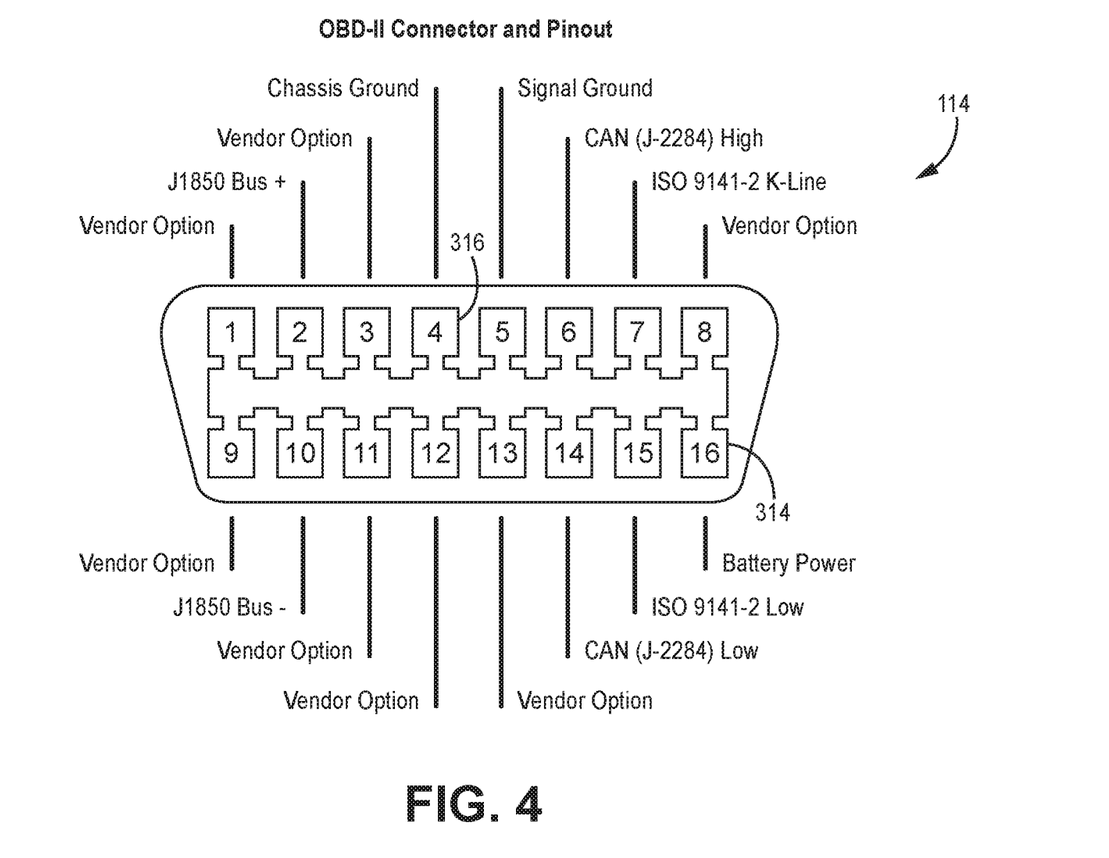
FIG. 4 is a diagram illustrating an example pinout of an OBD connector of the OBD device of FIG. 3.

The OBD connector 114 includes a plurality of contacts (e.g., pins) for various purposes. Each contact contacts a corresponding contact on the OBD connector 108 of the vehicle 108. These contacts include a ground contact 316 and a battery voltage (power) contact 314. FIG. 4 is an example pinout of the OBD connector 114—showing the pinout in accordance with the OBD-II standard. The battery power contact 316 is coupled to the positive voltage output from the battery 116 of the vehicle 106, which is typically around 12 volts or around 24 volts, depending on the vehicle. The ground contact 316 is coupled to the vehicle ground along with the negative voltage output of the battery 116. The positive voltage output from the battery 118 is coupled to the batter power contact to provide +12 or +24 volts to devices connected to the OBD connector 108. Thus, the OBD device 102 can receive operating power from the battery contact on the OBD connector 108 of the vehicle 106. The "vendor option" pins are pins that can be used by the vehicle manufacturer for proprietary messages. As mentioned above, these proprietary messages are typically not made public, and are therefore not accessible to a third-party OBD device 102 connected to the OBD connector 114.

The battery voltage can be detected by the OBD device 102 by sensing the voltage across the battery power contact 314 and the ground contact 316 of the OBD connector 114. The voltage sensor 312 of the OBD device 102 can be coupled to the battery power contact 314 and the ground contact 316 and can sense the voltage across the battery power contact 314 and the ground contact 316 to detect the voltage provided by the battery 116 of the vehicle 106. The processing device(s) 302 and/or the voltage sensor 312 can monitor the voltage provided by the battery 116 to identify temporary changes in the voltage thereof as discussed above.

In an example, the OBD device 302 can also include other components such as a global navigation satellite system (GNSS) receiver 318 (e.g., a global positioning system (GPS) receiver), one or more inertial sensors (e.g., accelerometer, gyroscope), or other components. The OBD device 102 can have other functions in addition to vehicle security alarm detection. For example, the OBD device 102 can track and report telematics for the vehicle 106 such as the vehicle's speed, location, diagnostic information, or other information attainable via the OBD interface and/or with other sensors of the OBD device 102. The one or more processing devices 302 can be couple to appropriate contacts on the OBD connector 114 to obtain such information from components of the vehicle via the vehicle diagnostics bus 116.

What is claimed is:

1. An on-board diagnostics (OBD) device comprising:
   an OBD connector configured to connect to a corresponding vehicle OBD connector of a vehicle, the OBD connector including a plurality of contacts for contacting corresponding vehicle contacts of the vehicle OBD connector, the plurality of contacts including at least a ground contact and a battery power contact, the ground and battery power contacts contacting corresponding ground and battery power contacts of the vehicle OBD connector;
   a voltage sensor coupled to the ground and battery power contacts of the OBD connector;
   a wireless transceiver;
   one or more processing devices coupled to the voltage sensor and the wireless transceiver;
   one or more data storage mediums coupled to the one or more processing devices, the one or more data storage mediums including instructions which, when executed by the one or more processing devices, cause the one or more processing devices to:
      monitor a voltage of the battery power contact via the voltage sensor;
      determine based on changes in the voltage whether a vehicle security alarm of the vehicle has been set-off; and
      if it is determined that the vehicle alarm has been set-off, send an alert to a remote device via the wireless transceiver, the alert indicating that the vehicle security alarm has been set-off.

2. The OBD device of claim 1, wherein determine based on changes in the voltage whether a vehicle security alarm has been set-off includes correlate the voltage with a voltage profile for the vehicle security alarm.

3. The OBD device of claim 2, wherein the instructions cause the one or more processing devices to calibrate the OBD device with the vehicle security alarm to obtain the voltage profile.

4. The OBD device of claim 1, comprising:
   a sound sensor,
   wherein the instructions cause the one or more processing devices to obtain samples of ambient sound proximate the OBD device via the sound sensor,
   wherein determine whether the vehicle security alarm has been set-off includes determine based on changes in the ambient sound and based on changes in the voltage whether the vehicle security alarm has been set-off.

5. The OBD device of claim 4, wherein determine whether the vehicle security alarm has been set-off includes correlate two or more of the ambient sound, the voltage on the battery power contacts, a voltage profile for the vehicle security alarm, and a sound profile for the vehicle security alarm.

6. The OBD device of claim 5, wherein correlating includes correlating the ambient sound with the voltage.

7. The OBD device of claim 5, wherein the instructions cause the one or more processing devices to calibrate the OBD device with the vehicle security alarm to obtain the voltage profile and the sound profile.

8. The OBD device of claim 1, wherein the instructions cause the one or more processing devices to:
   monitor for a trigger event, the trigger event being an event caused by a vehicle alarm being set-off; and
   begin to sample one or both of the voltage of the battery power contact and an ambient sound proximate the OBD device in response to detecting a trigger event,
   wherein determine whether a vehicle security alarm of the vehicle has been set-off includes determine based on one or both of the voltage and the ambient sound whether a vehicle security alarm has been set-off.

9. The OBD device of claim 1, wherein send an alert includes at least one of: send an alert that causes a text message to be sent to a user associated with the vehicle or send an alert to an app on a phone of a user associated with the vehicle.

10. The OBD device of claim 1, wherein the OBD vehicle connector is a connector conforming to the OBD-II standard.

* * * * *